United States Patent
Jarvis et al.

(10) Patent No.: US 10,725,816 B2
(45) Date of Patent: Jul. 28, 2020

(54) OPTIMIZING PIPELINE EXECUTION SCHEDULING BASED ON COMMIT ACTIVITY TRENDS, PRIORITY INFORMATION, AND ATTRIBUTES

(71) Applicant: INTERNATIONAL BUSINESS MACHINES CORPORATION, Armonk, NY (US)

(72) Inventors: Matthew P. Jarvis, Burlington, MA (US); Aidyl M. Kareh, Guaynabo, PR (US); Vincent B. Phan, Mission Viejo, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 414 days.

(21) Appl. No.: 15/405,984

(22) Filed: Jan. 13, 2017

(65) Prior Publication Data
US 2018/0203727 A1    Jul. 19, 2018

(51) Int. Cl.
| | | |
|---|---|---|
| *G06F 9/46* | (2006.01) | |
| *G06F 9/48* | (2006.01) | |
| *G06F 8/70* | (2018.01) | |
| *G06F 11/36* | (2006.01) | |
| *G06F 8/00* | (2018.01) | |

(52) U.S. Cl.
CPC ............. *G06F 9/4843* (2013.01); *G06F 8/70* (2013.01); *G06F 11/3672* (2013.01); *G06F 11/3688* (2013.01); *G06F 8/00* (2013.01)

(58) Field of Classification Search
CPC ........ G06F 9/4881; G06F 9/4843; G06F 9/46; G06F 9/5005; G06F 8/00; G06F 8/20; G06F 8/41; G06F 8/60; G06F 8/63; G06F 8/70–71; G06F 11/3612; G06F 11/3664; G06F 11/368; G06F 11/3672; G06F 11/3688

See application file for complete search history.

(56) References Cited

U.S. PATENT DOCUMENTS

| | | | | |
|---|---|---|---|---|
| 8,312,430 | B2* | 11/2012 | Best | G06F 11/3688 717/120 |
| 8,533,676 | B2* | 9/2013 | Watters | G06F 8/71 717/106 |

(Continued)

OTHER PUBLICATIONS

Austel et al.; "Continuous Delivery of Composite Solutions: A case for Collaborative Software Defined Paas Environments"; IBM, ACM Jun. 10, 2015; (Austel_Jun2015.pdf; pp. 1-4) (Year: 2015).*

(Continued)

*Primary Examiner* — Hiren P Patel
(74) *Attorney, Agent, or Firm* — Nicholas Bowman; Andrew D. Wright; Roberts Calderon Safran & Cole, P.C.

(57) ABSTRACT

A computer-implemented method includes receiving, by a computing device, an event notification; determining, by the computing device, whether to immediately execute a pipeline including a commit associated with the event notification based on historical trends of commits entering the pipeline at a similar time period as a current time; and immediately executing or delaying the execution of the pipeline, by the computing device, based on the determining whether to immediately execute the pipeline.

19 Claims, 8 Drawing Sheets

(56) References Cited

U.S. PATENT DOCUMENTS

| | | | | |
|---|---|---|---|---|
| 8,677,315 B1* | 3/2014 | Anderson | ............... | G06F 8/60 717/101 |
| 8,782,435 B1 | 7/2014 | Ghose | | |
| 8,875,091 B1* | 10/2014 | Rouleau | ............... | G06F 8/10 717/101 |
| 9,454,459 B2* | 9/2016 | Bigwood | ............... | G06F 11/3624 |
| 9,535,689 B2* | 1/2017 | Blitzstein | ............... | H04L 65/403 |
| 9,588,876 B2* | 3/2017 | Swierc | ............... | G06F 11/3668 |
| 9,612,821 B2* | 4/2017 | Iyer | ............... | G06F 8/65 |
| 9,760,366 B2* | 9/2017 | Frank | ............... | G06F 16/173 |
| 9,858,071 B2* | 1/2018 | Amano | ............... | H04L 65/403 |
| 9,886,269 B2* | 2/2018 | Grillo | ............... | G06F 16/148 |
| 9,921,948 B2* | 3/2018 | Zieder | ............... | G06F 8/60 |
| 9,940,219 B2* | 4/2018 | Bigwood | ............... | G06F 11/3624 |
| 10,048,954 B2* | 8/2018 | Ahmed | ............... | G06F 12/0875 |
| 10,175,978 B2* | 1/2019 | Biddle | ............... | G06F 11/3668 |
| 10,193,961 B2* | 1/2019 | Frank | ............... | H04L 67/10 |
| 10,216,512 B1* | 2/2019 | Mathew | ............... | G06F 8/71 |
| 10,216,608 B1* | 2/2019 | Arguelles | ............... | G06F 11/3612 |
| 2004/0194060 A1* | 9/2004 | Ousterhout | ............... | G06F 8/41 717/120 |
| 2005/0210448 A1* | 9/2005 | Kipman | ............... | G06F 8/20 717/120 |
| 2006/0184944 A1* | 8/2006 | Schwerk | ............... | G06F 9/4881 718/101 |
| 2006/0206596 A1* | 9/2006 | Multerer | ............... | G06F 8/10 709/220 |
| 2006/0206870 A1* | 9/2006 | Moulden, Jr. | ............... | G06F 11/3664 717/124 |
| 2007/0234320 A1* | 10/2007 | Gu | ............... | G06F 8/41 717/140 |
| 2007/0266038 A1* | 11/2007 | Hegde | ............... | G06F 8/36 |
| 2008/0046692 A1 | 2/2008 | Michalak et al. | | |
| 2008/0103797 A1* | 5/2008 | Holden | ............... | G06Q 10/06 705/300 |
| 2008/0222640 A1* | 9/2008 | Daly | ............... | G06F 9/4881 718/103 |
| 2010/0241469 A1* | 9/2010 | Weigert | ............... | G06F 8/75 717/124 |
| 2010/0287559 A1* | 11/2010 | Mergen | ............... | G06F 9/4893 718/103 |
| 2011/0004867 A1* | 1/2011 | Holden | ............... | G06F 11/3676 717/127 |
| 2011/0264862 A1 | 10/2011 | Karlsson et al. | | |
| 2011/0276939 A1* | 11/2011 | Frankin | ............... | G06F 8/20 717/101 |
| 2012/0036497 A1* | 2/2012 | Karthik | ............... | G06F 8/71 717/122 |
| 2012/0221733 A1* | 8/2012 | Greene | ............... | G06Q 10/10 709/226 |
| 2013/0014083 A1* | 1/2013 | Martineau | ............... | G06F 8/71 717/122 |
| 2013/0174124 A1* | 7/2013 | Watters | ............... | G06F 8/71 717/122 |
| 2013/0290265 A1* | 10/2013 | Hari | ............... | G06F 11/1461 707/654 |
| 2014/0181789 A1* | 6/2014 | Canter | ............... | G06F 8/34 717/113 |
| 2014/0189641 A1* | 7/2014 | Anderson | ............... | G06F 8/60 717/110 |
| 2014/0297355 A1* | 10/2014 | Ohashi | ............... | G06Q 10/06316 705/7.26 |
| 2015/0100943 A1 | 4/2015 | Gabel et al. | | |
| 2015/0106790 A1* | 4/2015 | Bigwood | ............... | G06F 11/3624 717/127 |
| 2015/0128149 A1* | 5/2015 | Meijer | ............... | G06F 9/4843 718/105 |
| 2015/0277900 A1* | 10/2015 | O'Keeffe | ............... | G06F 8/70 717/113 |
| 2015/0370554 A1* | 12/2015 | Benedict | ............... | G06F 11/3692 717/101 |
| 2015/0378731 A1 | 12/2015 | Lai et al. | | |
| 2016/0034258 A1* | 2/2016 | Wijngaard | ............... | G06F 8/73 717/123 |
| 2016/0034270 A1* | 2/2016 | Swierc | ............... | G06F 11/3668 717/126 |
| 2016/0253172 A1* | 9/2016 | Shani | ............... | G06Q 10/06393 717/101 |
| 2016/0299787 A1* | 10/2016 | Hayakawa | ............... | G06F 9/4881 |
| 2017/0010889 A1* | 1/2017 | Spektor | ............... | G06F 8/71 |
| 2017/0010918 A1* | 1/2017 | Sato | ............... | G06F 9/4881 |
| 2017/0115976 A1* | 4/2017 | Mills | ............... | G06Q 10/06 |
| 2017/0180459 A1* | 6/2017 | Frank | ............... | H04L 67/10 |
| 2017/0220012 A1* | 8/2017 | Hart | ............... | H04L 67/12 |
| 2018/0081652 A1* | 3/2018 | Ahmed | ............... | G06F 8/4442 |
| 2018/0101399 A1* | 4/2018 | Jain | ............... | G06F 9/485 |
| 2018/0157245 A1* | 6/2018 | Kugler | ............... | G06F 8/71 |
| 2018/0189055 A1* | 7/2018 | Dasgupta | ............... | G06F 11/3608 |
| 2018/0293158 A1* | 10/2018 | Baughman | ............... | G06F 11/3692 |

OTHER PUBLICATIONS

Martin Fowler; "Continuous Integration"; (Fowler_May2006.pdf; pp. 1-14) (Year: 2006).*

Manish Virmani; "Understanding DevOps & Bridging the gap from Continuous Integration to Continuous Delivery" IBM, IEEE 2015 (Virmani_2015.pdf; pp. 1-5) (Year: 2015).*

Michael Hilton et al., "Usage, Costs, and Benefits of Continuous Integration in Open-Source Projects" ACM 2016 (Hilton_2016.pdf; pp. 426-437) (Year: 2016).*

Daniel Stahl et al., "Modeling Continuous integration practices differences in industry software development" The Journal of Systems and Software, Sep. 8, 2013, (Stahl_2013.pdf; pp. 48-59) (Year: 2013).* ip.com, "Smarter Capacity Planner, Based on the IFPUG Function Points", Dec. 3, 2010, 12 pages.

ip.com, "An Automatic Defect Tracking, Analysis and Reporting System with Event Based Scheduling", May 27, 2011, 6 pages.

Mell et al., "The NIST Definition of Cloud Computing", NIST, Special Publication 800-145, Sep. 2011, 7 pages.

IBM Bluemix DevOps Services Delivery Pipeline, https://www.ibm.com/devops/method/content/deliver/practice_delivery_pipeline/, Accessed Jan. 13, 2017, 9 pages.

IBM Bluemix DevOps Services Delivery Pipeline, https://hub.jazz.net/docs/deploy/, Accessed Jan. 13, 2017, 8 pages.

IBM Rational Team Concert—Jazz SCM & Build, https://jazz.net/products/rational-team-concert/features/scm, Accessed Jan. 13, 2017, 4 pages.

IBM Rational Team Concert—Jazz SCM & Build, https://jazz.net/products/rational-team-concert/features/build, Accessed Jan. 13, 2017, 5 pages.

Jenkins Documentation, https://jenkins.io/doc/, Accessed Jan. 13, 2017, 3 pages.

Travis CI, https://docs.travis-ci.com/, Accessed Jan. 13, 2017, 3 pages.

"List of IBM Patents or Patent Applications Treated as Related" 1 page, dated Oct. 25, 2019.

Specification "Optimizing Pipeline Execution Scheduling Based on Commit Activity Trends, Priority Information, and Attributes" and Drawings in U.S. Appl. No. 16/657,425 filed Oct. 18, 2019, 45 pages.

* cited by examiner

OPTIMIZING PIPELINE EXECUTION SCHEDULING BASED ON COMMIT ACTIVITY TRENDS, PRIORITY INFORMATION, AND ATTRIBUTES

BACKGROUND

The present invention generally relates to optimizing pipeline execution scheduling and, more particularly, to optimizing pipeline execution scheduling based on commit activity trends, priority information, and attributes.

Software build and delivery pipeline solutions include automatically running or executing software pipeline jobs. For example, builds/pipeline jobs may be run on a fixed schedule, or may be run whenever a new commit (e.g., a set of changes to files, such as source code, stored in a repository) is pushed to a source control management (SCM) repository or application server. Running builds on a fixed schedule may not allow for flexibility and can cause unnecessary or even potentially harmful delays in pushing new changes through the pipeline. On the other hand, running a build and delivery pipeline for every commit as it is received may not be efficient during periods of high commit activity. For example, running a build and delivery pipeline for each commit as received may overwhelm a pipeline that has limited computing resources, or may not be cost effective for a customer who is charged for resources consumed by their pipeline executions.

SUMMARY

In an aspect of the invention, a computer-implemented method includes receiving, by a computing device, an event notification; determining, by the computing device, whether to immediately execute a pipeline including a commit associated with the event notification based on historical trends of commits entering the pipeline at a similar time period as a current time; and immediately executing or delaying the execution of the pipeline, by the computing device, based on the determining whether to immediately execute the pipeline.

In an aspect of the invention, there is a computer program product for optimizing scheduling of pipeline execution. The computer program product comprising a computer readable storage medium having program instructions embodied therewith, the program instructions executable by a computing device to cause the computing device to: receive a an event notification; determine whether to immediately execute a pipeline including a commit associated with the event notification based on attributes of the commit; and immediately executing or delaying the execution of the pipeline, by the computing device, based on the determining whether to immediately execute the pipeline.

In an aspect of the invention, a system includes: a CPU, a computer readable memory and a computer readable storage medium associated with a computing device; program instructions to receive an event notification; program instructions to determine whether to immediately execute a pipeline including a commit associated with the event notification based on historical activity trends of commits entering the pipeline; and program instructions to immediately execute or delaying the execution of the pipeline based on the determining whether to immediately execute the pipeline. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
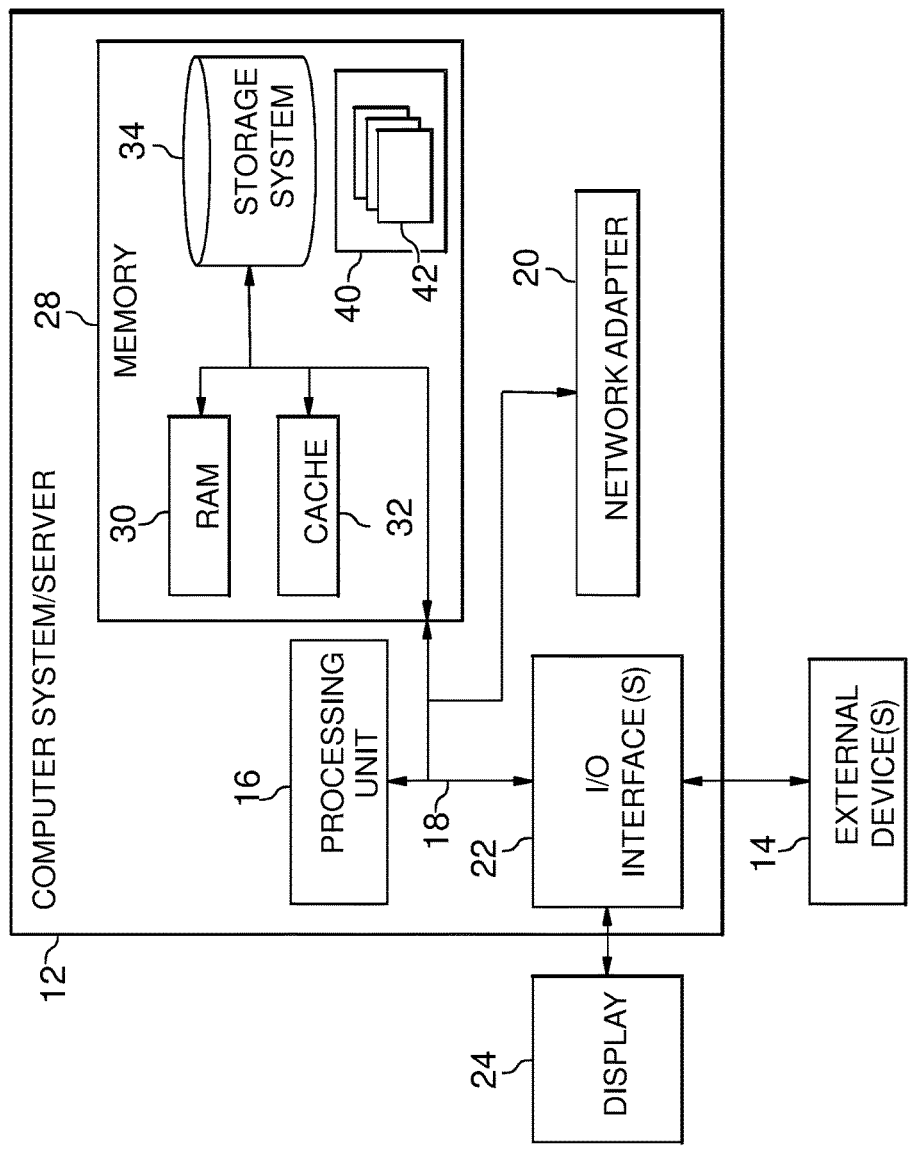
FIG. 1 depicts a cloud computing node according to an embodiment of the present invention.

The present invention generally relates to optimizing pipeline execution scheduling and, more particularly, to optimizing pipeline execution scheduling based on commit activity trends, priority information, and attributes. Aspects of the present invention may schedule the software execution of a software pipeline of one or more pipeline jobs (e.g., build jobs, test jobs, deploy jobs, etc.) based on analyzing historical commit activity/trends, priority information of the commits, and/or other attributes regarding the commits (e.g., a duration of time needed to execute the jobs/builds in the pipeline, a risk level associated with the jobs/builds, etc.). As an example, a pipeline execution management server may determine whether additional commits are likely to enter the pipeline in the near future and intelligently decide whether or not it is preferable to execute the pipeline immediately or wait for more commits to enter the pipeline. Aspects of the present invention may be applied to the pipeline execution as a whole or to any particular stage in the pipeline (e.g., at a building stage, a testing stage, deploying stage, etc.).

As described herein, historical commit activity is analyzed to intelligently schedule build and delivery pipeline executions. By analyzing commit activity trends, the likelihood that additional commits will be pushed to the pipeline in the near future can be estimated, and thus, a determination may be made as to whether to execute the delivery pipeline immediately or to delay execution until receiving additional commits as expected based on the trends. Accordingly, the load on the delivery pipeline may be reduced by delaying execution of a pipeline until expected commits are received, while also still pushing changes through the pipeline in a timely manner. As an example, pipeline execution may be delayed (e.g., by 5 minutes, 10 minutes, 15 minutes, or some other period of time) during a period of historically high commit activity (e.g., to allow for more commits to enter the pipeline for batch execution). Conversely, a pipeline may be immediately executed after a single commit has been received during a period of historically low commit activity (e.g., to prevent unnecessary delays in execution of the pipeline).

As further described herein, priority information, risk information, execution duration information, and/or other information may also be used to determine whether to immediately execute a delivery pipeline, or delay execution. For example, a commit that has been identified as relatively high priority may be more likely to be executed sooner than that with a low priority. As another example, a commit that is considered to have high risk for errors/failures may be less likely to be grouped or batched for execution with other commits (e.g., in order to more easily isolate errors in executing a pipeline with a high-risk commit and to reduce the likelihood of needing to re-execute a larger batch of commits). As another example, a pipeline job that takes a relatively long time to execute (e.g. an extensive or large integration test suite) may be more likely to batch multiple commits into a single run to reduce a delay in delivery. Further, aspects of the present invention may be used to determine whether to immediately execute or delay execution of certain pipeline stages. Further, when it is determined that execution should be delayed, delay duration may be determined and pipeline execution may begin if subsequent commits have not been received at the end of the duration.

As described herein, aspects of the present invention may schedule the execution of a pipeline having one or more commits (e.g., builds, jobs, etc.). The commits may include updates, new application installations, patches, code changes, etc., to services provided in a local computer network or a cloud computer network. Aspects of the present invention provide a technical solution to a technical problem that exists in a computing environment. Further, aspects of the present invention improve the functionality of a computing system by improving the efficiency and scheduling in which a pipeline of commits is executed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
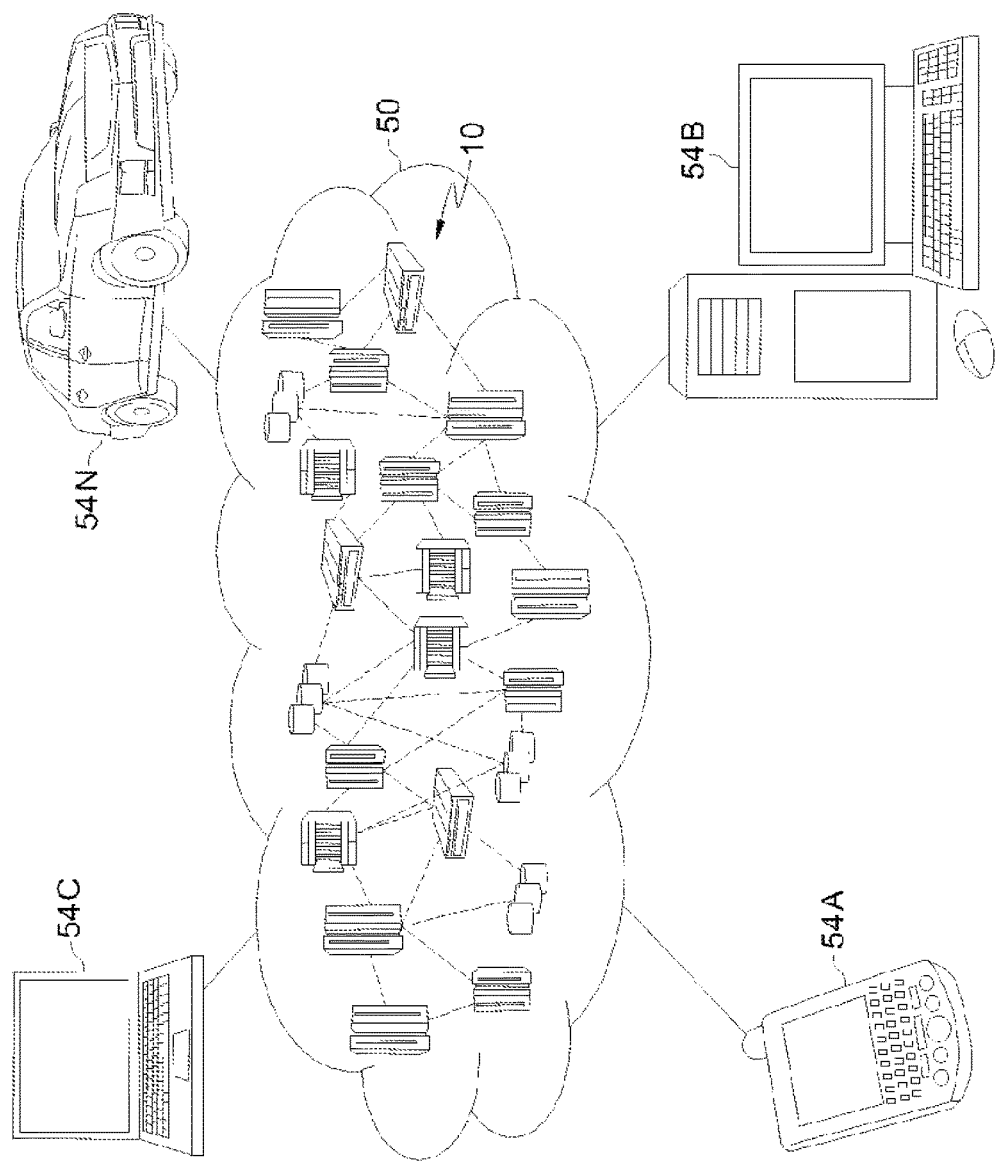
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
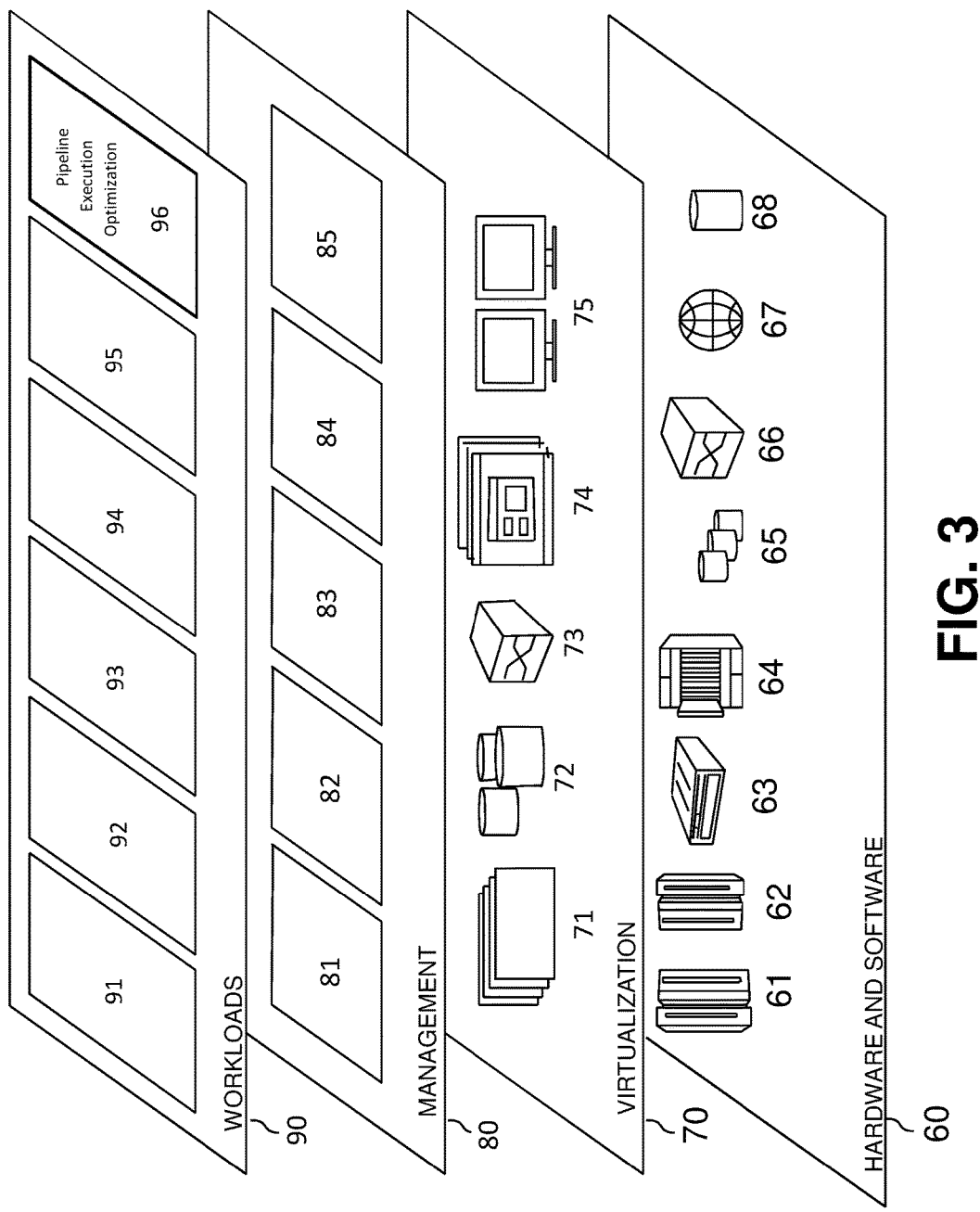
FIG. 3 depicts abstraction model layers according to an embodiment of the present

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and pipeline execution optimization 96.

Referring back to FIG. 1, the program/utility 40 may include one or more program modules 42 that generally carry out the functions and/or methodologies of embodiments of the invention as described herein (e.g., such as the functionality provided by pipeline execution optimization 96). Specifically, the program modules 42 may receive an event notification indicating that a commit has entered a pipeline, determine attributes of the commit, determine commit information based on the attributes, determine historical commit activity trends during a current time period in which the commit is received, and determine whether to immediately execute a pipeline including the commit based on the commit information and trends, or delay the execution until additional commits enter the pipeline. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a pipeline execution management server 230 as shown in FIG. 4.

Figure 4:
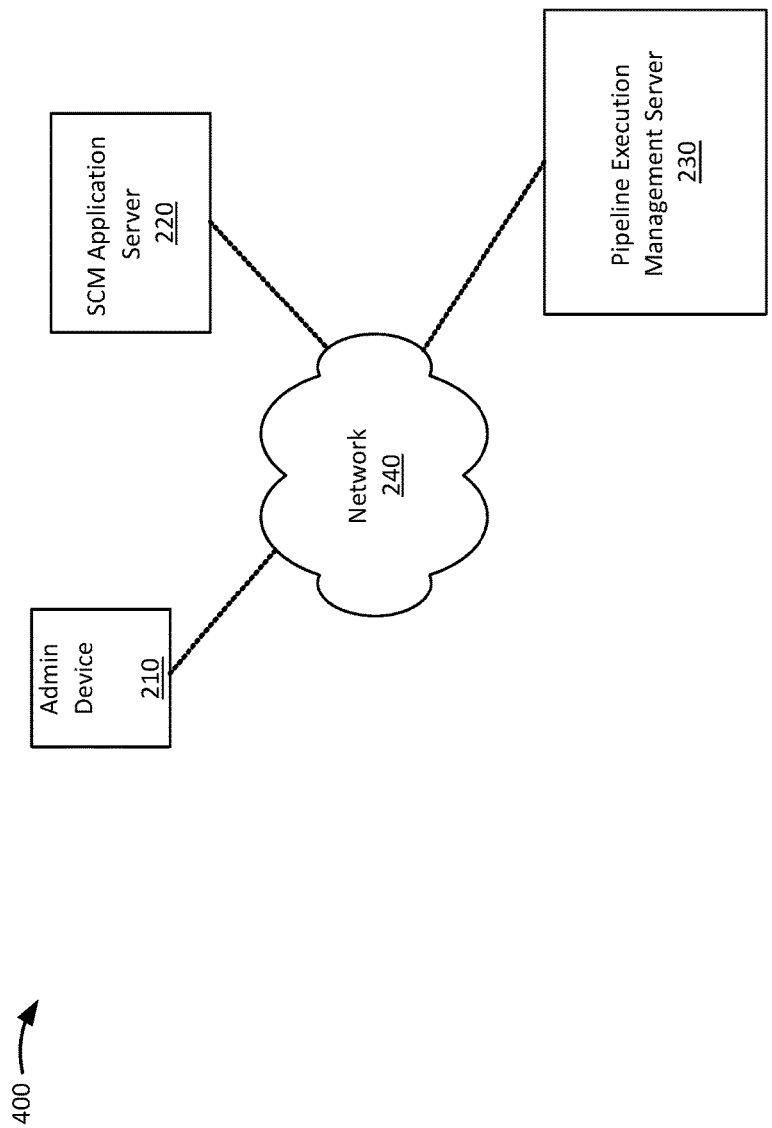
FIG. 4 shows an example environment in accordance with aspects of the present invention.

FIG. 4 shows an example environment in accordance with aspects of the present invention. As shown in FIG. 4, environment 400 may include an admin device 210, a source control management (SCM) application server 220, a pipeline execution management server 230, and network 240. In embodiments, one or more components in environment 400 may correspond to one or more components in the cloud computing environment of FIG. 2. In embodiments, one or more components in environment 400 may include components of computer system/server 12 of FIG. 1.

The admin device 210 may include one or more computing devices (e.g., such as computer system/server 12 of FIG. 1) that provides instructions for adding a commit to a pipeline to be subsequently executed. More specifically, the admin device 210 may provide a user interface via which an administrator may input instructions and details for a commit to be added to the pipeline (e.g., updates, applications, patches, and/or other commits). The admin device 210 may provide access to the SCM application server 220 which may receive the commit from the administrator of the admin device 210 via the user interface.

The SCM application server 220 may include one or more computing devices (e.g., such as computer system/server 12 of FIG. 1) that hosts an application and/or a repository that stores commits received from the admin device 210. In embodiments, the SCM application server 220 may provide, to the pipeline execution management server an event notification indicating that a commit has entered the pipeline. For example, the SCM application server 220 may provide the notification based on any number of configurable rules defining an event. As an example, an event may be considered to be when the SCM application server 220 receives a single commit, or when the SCM application server 220 receives a threshold number of commits, or a commit of a certain size, etc. In embodiments, the SCM application server 220 may store a pipeline of commits until they have been executed.

The pipeline execution management server 230 may include one or more devices (e.g., such as computer system/server 12 of FIG. 1) that receives an event notification (e.g., a notification that a commit has entered a pipeline) from the SCM application server 220. In embodiments, the pipeline execution management server 230 may determine attributes of the commit (a size, comments included in a message accompanying the commit notification, a stage of the pipeline, etc.), determine commit information based on the attributes (e.g., a priority level, a duration time to execute, a risk level, etc.), determine historical commit activity trends during a current time period in which the commit is received, and determine whether to immediately execute a pipeline including the commit based on the commit information and trends, or delay the execution until additional commits enter the pipeline. Additionally, or alternatively, the pipeline execution management server 230 may determine whether to immediately or delay execution of the pipeline based on the pipeline stage (e.g., based on an average length of time to execute the stage). For relatively longer pipeline stage execution times, the pipeline execution management server 230 may be more likely to wait until a batch of additional commits enter the pipeline. In embodiments, the pipeline execution management server 230 may communicate with the SCM application server 220 to execute a pipeline that includes one or more commits. Other processes of the pipeline execution management server 230 are described in greater detail herein.

The network 240 may include network nodes, such as network nodes 10 of FIG. 2. Additionally, or alternatively, the network 240 may include one or more wired and/or wireless networks. For example, the network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4. Also, in some implementations, one or more of the devices of the environment 400 may perform one or more functions described as being performed by another one or more of the devices of the environment 400. Devices of the environment 400 may interconnect via wired connections, wireless connections, or a combination of wired and wireless connections.

Figure 5:
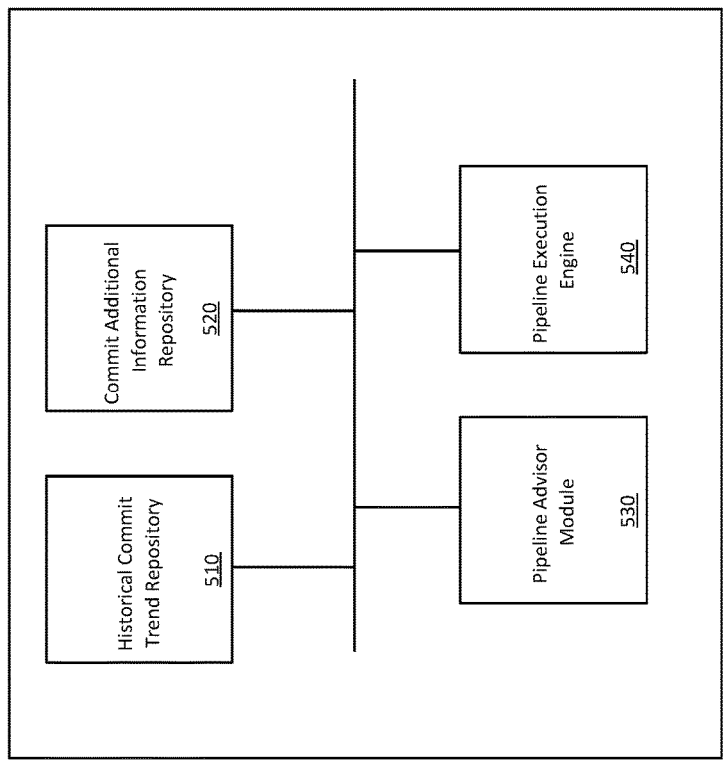
FIG. 5 shows a block diagram of example components of a pipeline execution management server in accordance with aspects of the present invention.

FIG. 5 shows a block diagram of example components of a pipeline execution management server 230 in accordance with aspects of the present invention. As shown in FIG. 5, the pipeline execution management server 230 may include a historical commit trend repository 510, a commit additional information repository 520, pipeline advisor module 530, and a pipeline execution engine 540. In embodiments, the pipeline execution management server 230 may include additional or fewer components than those shown in FIG. 5. In embodiments, separate components may be integrated into a single computing component or module. Additionally, or alternatively, a single component may be implemented as multiple computing components or modules.

The historical commit trend repository 510 may include a data storage device (e.g., storage system 34 of FIG. 1) that stores information identifying the history of commits received within a target computing environment. The historical commit trend repository 510 may also store information identifying the trends for when commits have been received, the types of commits received, the number of commits received during different time periods, etc.

The commit additional information repository 520 may include a data storage device (e.g., storage system 34 of FIG. 1) that stores information regarding commit details based on attributes. For example, the commit additional information repository 520 may information indicating the risk level associated with the commit (e.g., based on the builds and workflows included in the commit), historical duration for executing the a pipeline/pipeline stage, and/or other information that relates to whether a given pipeline including the commit should be immediately executed or delayed.

The pipeline advisor module 530 may include a program module (e.g., program module 42 of FIG. 1) that determines whether to immediately execute a pipeline including one or more commits or delay execution of the pipeline until additional commits enter the pipeline (e.g., are received by the SCM application server 220). In embodiments, the pipeline advisor module 530 may make this determination based on the historical commit trends information stored by the historical commit trend repository 510. Additionally, or alternatively, the pipeline advisor module 530 may make the determination by extracting attributes for commits in the pipeline and obtaining additional information based on the attributes from the commit additional information repository 520. For example, the pipeline advisor module 530 may obtain information indicating a risk level and/or execution duration associated with the commit based on its attributes.

Additionally, or alternatively, the pipeline advisor module 530 may derive the risk level and/or execution duration based on the details of the commit. Additionally, or alternatively, the pipeline advisor module 530 may determine whether to immediately execute or delay execution of a pipeline including the commit based on determining a priority level based on information included in a message accompanying the commit (e.g., based on a priority flag, text/language recognition techniques that indicate the priority, etc.).

In embodiments, the pipeline advisor module 530 may determine a delay duration for an amount of time before which the pipeline including the commit should be executed. The delay duration may be based on the historical commit trend information, the additional commit information, the determined priority level, risk levels, or a combination thereof. For example, the delay duration may be relatively shorter during period of relatively higher commit activity and for relatively higher priority levels and risk levels.

The pipeline execution engine 540 may include a program module (e.g., program module 42 of FIG. 1) that receives an event notification (indicating that a commit has entered the pipeline) and queries the pipeline advisor module 530 as to whether a pipeline including the commit should be immediately executed or delayed. The pipeline execution engine 540 may receive a response to the query and may either immediately execute a pipeline including the commit, or wait for a specified period of time. In embodiments, the pipeline execution engine 540 may communicate with the SCM application server 220 to execute the pipeline. In embodiments, the pipeline execution engine 540 may execute the pipeline in stages and after each stage, the pipeline execution engine 540 may again communicate with the pipeline advisor module 530 to determine whether a subsequent stage of the pipeline should be executed based on the commit trends, execution duration, risk levels, etc. associated with execution of the subsequent pipeline stage.

Figure 6:
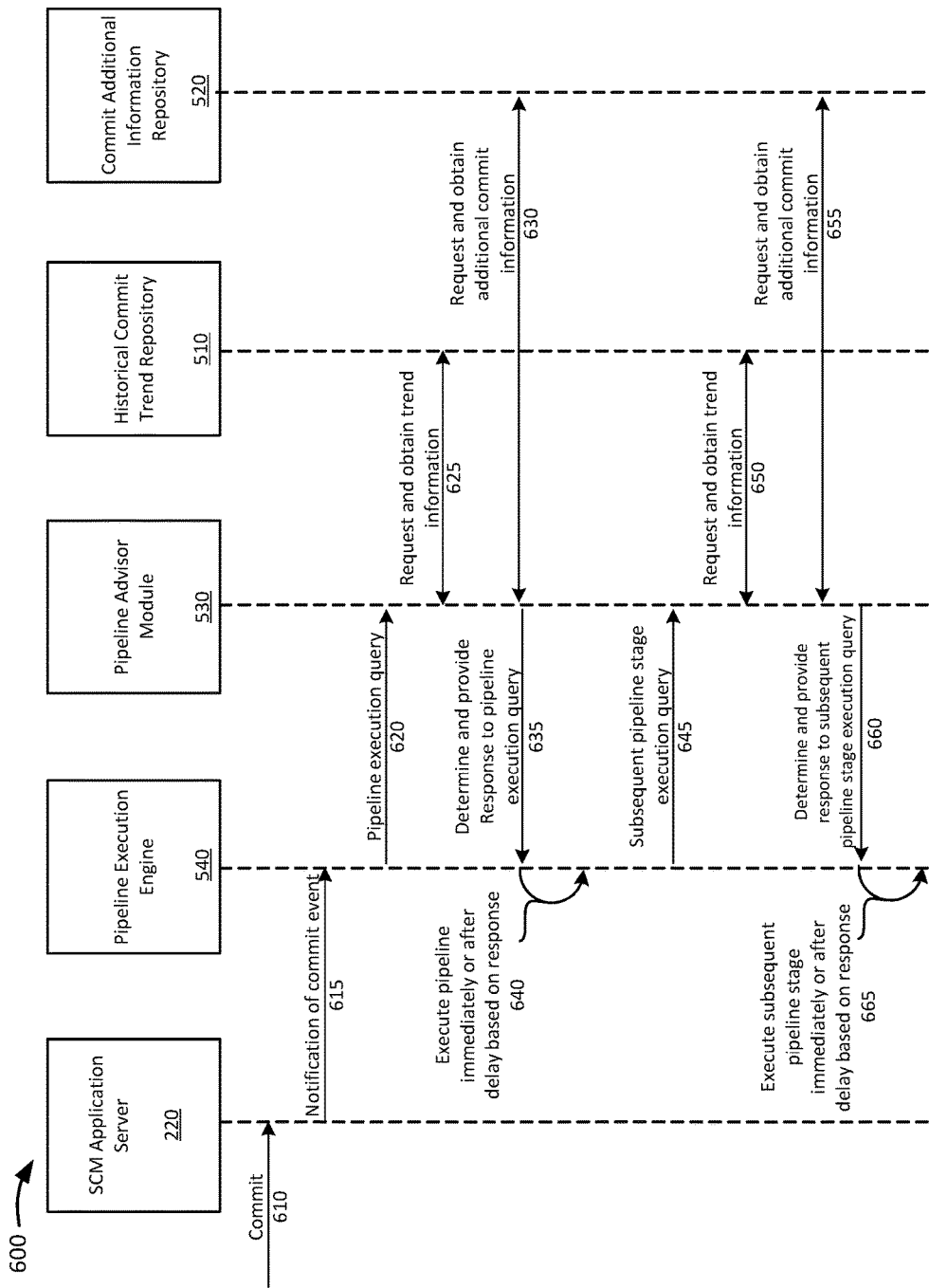
FIG. 6 shows an example call flow diagram of a process for scheduling software execution of a software pipeline in accordance with aspects of the present invention.

FIG. 6 shows an example call flow diagram of a process 600 for scheduling software execution of a software pipeline. The steps of FIG. 6 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 6, the SCM application server 220 may receive a commit at step 610 (e.g., from admin device 210 as inputted by an administrator). At step 615, the SCM application server 220 may provide (e.g., to the pipeline execution management server 230) a notification of an event (e.g., based on configurable rules defining when an event has occurred, such as when a single commit has been received, when a threshold number of commits have been received, etc.). At step 620, the pipeline execution engine 540 may query the pipeline advisor module 530 as to whether the pipeline of the SCM application server 220 should be executed. As described herein, the pipeline may include the commit received at step 610 and may possibly include additional commits that previously entered the pipeline and are awaiting pipeline execution (e.g., commits that have not yet been included in pipeline execution). Also at step 620, the pipeline execution engine 540 may provide details regarding the event notification to the pipeline advisor module 530 (e.g., details/attributes of the commit(s) identified in the notification, such as a message accompanying the commit notification, a size of the commit, priority information, etc.). At step 625, the pipeline advisor module 530 may communicate with the historical commit trend repository 510 to request and obtain historical commit trend information. At step 630, the pipeline advisor module 530 may communicate with the commit additional information repository 520 to request and obtain additional commit information (e.g., historical risk information, historical execution duration information, etc.).

At step 635, the pipeline advisor module 530 may determine whether the pipeline should be immediately executed or delayed based on receiving the trend information and/or the additional commit information. Additionally, or alternatively, the pipeline advisor module 530 may determine whether the pipeline should be immediately executed or delayed based on deriving, execution duration (e.g., based on the size of the commit), priority information (e.g., based on the message accompanying the event notification), etc. Further in step 635, the pipeline advisor module 530 may provide a response indicating whether to execute the pipeline immediately or after a delay. At step 640, the pipeline execution engine 540 may execute the pipeline in accordance with the response.

At step 645, the pipeline execution engine 540 may provide a query for executing a subsequent phase of the pipeline (e.g., if applicable for a system designed to execute pipelines in stages). At step 650, the pipeline advisor module 530 may communicate with the historical commit trend repository 510 to request and obtain historical commit trend information (e.g., in a similar manner as step 625). At step 655, the pipeline advisor module 530 may communicate with the commit additional information repository 520 to request and obtain additional commit information (in a similar manner as step 630).

At step 660, the pipeline advisor module 530 may determine whether the pipeline should be immediately executed or delayed and provide a response indicating the decision (in a similar manner as step 635). At step 665, the pipeline execution engine 540 may execute the pipeline in accordance with the response. Steps 645-665 may be repeated until all stages of the pipeline have been executed.

Figure 7A:
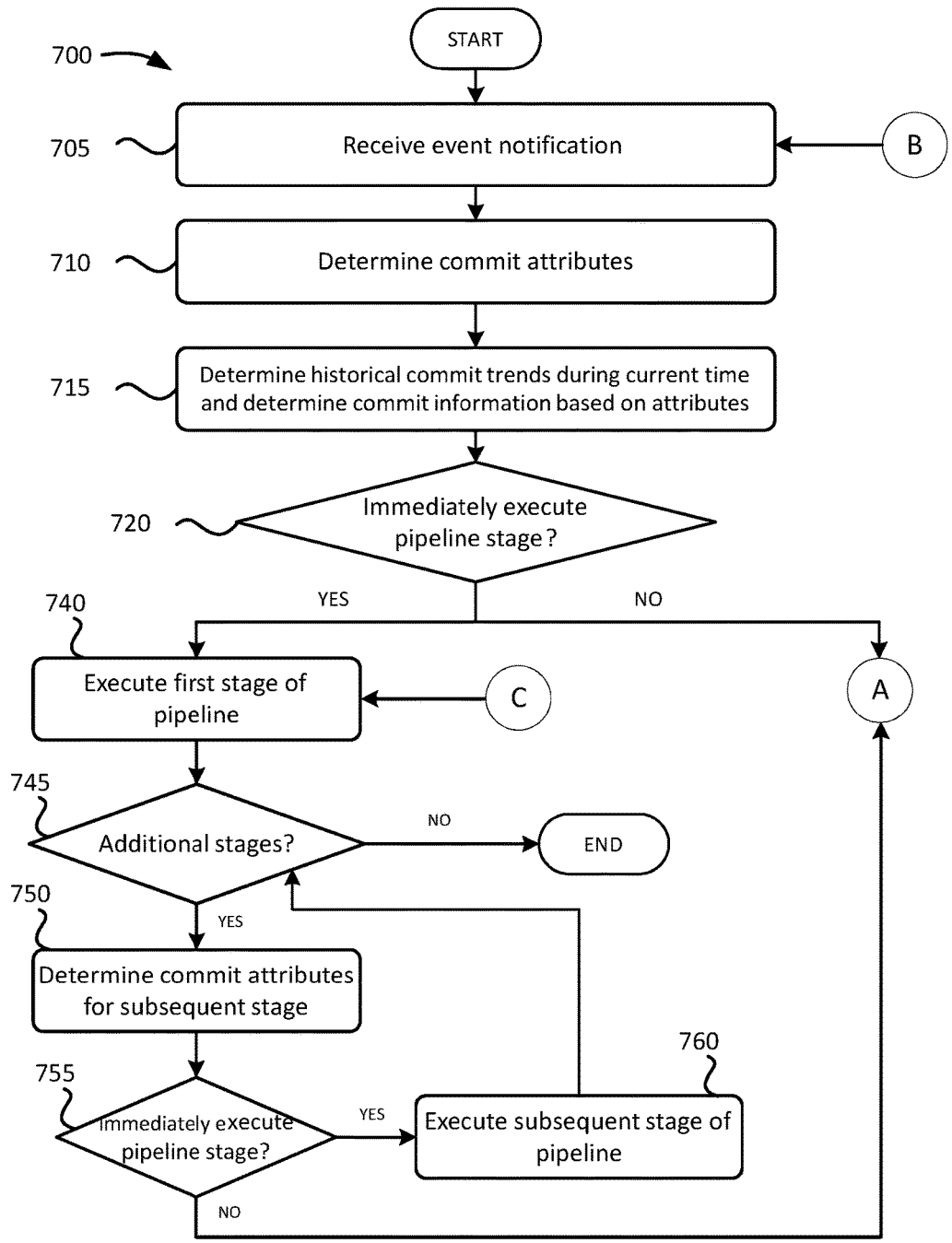
FIGS. 7A and 7B show an example flowchart of a process for scheduling software execution of a software pipeline in accordance with aspects of the present invention.
Figure 7B:
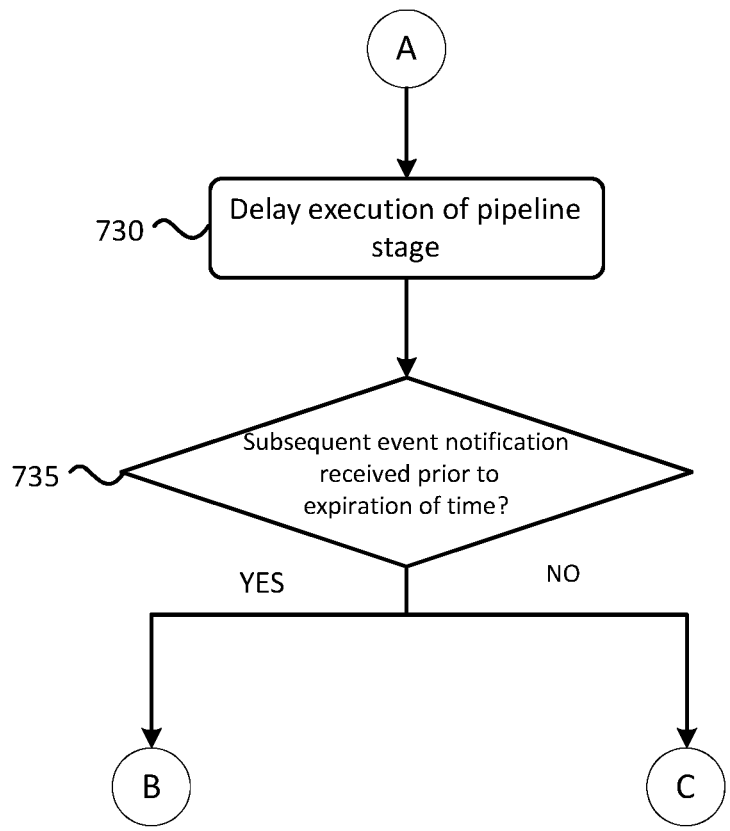

FIGS. 7A and 7B show an example flowchart of a process for scheduling software execution of a software pipeline The steps of FIGS. 7A and 7B may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 7A, process 700 may include receiving an event notification (step 705) and determining the attributes of the commit. For example, as described above with respect to the pipeline execution engine 540, the pipeline execution management server 230 may receive an event notification from the SCM application server 220. The event notification may indicate that a commit has entered the pipeline. Process 700 also include determining commit attributes (step 710). For example, the pipeline execution management server 230 may extract attributes of the commit, such as the size of the commit, a message accompanied by the event notification, a type of the commit, etc.

Process 700 may further include determining historical commit trends during the current time and determine commit information based on the attributes (step 715). For example, as described above with respect to the pipeline advisor module 530, the pipeline execution management server 230 may determine the historical commit trends during a current time based on information stored by the historical commit trend repository 510. In embodiments, the pipeline execution management server 230 may determine the historical commit trends/activity for commits received during a similar time of day, time of week, time of month, etc. as the current time. The pipeline execution management server 230 may further determine additional commit information based on the attributes, such as priority information (e.g., based on information included in a message accompanying the event notification), risk level, execution duration, or the like.

Process 700 may also include determining whether to immediately execute a pipeline stage (step 720). For example, as described above with respect to the pipeline advisor module 530, the pipeline execution management server 230 may determine whether to immediately execute the pipeline stage (including the one or more commits in a pipeline). In embodiments, the pipeline execution management server 230 may make this determination based on the historical commit trends information stored by the historical commit trend repository 510. Additionally, or alternatively, the pipeline execution management server 230 may make the determination based on the attributes and/or additional information for the commit associated with the commit notification received at step 705.

If, for example, the pipeline advisor module 530 determines not to immediately execute the pipeline (step 720—NO), process 700 may proceed to point A and may include delaying execution of the pipeline stage (step 730 as shown in FIG. 7B). For example, pipeline execution management server 230 may delay the execution of the pipeline stage by refraining from executing the pipeline stage. Further, the pipeline execution management server 230 may determine an amount of time for which to refrain from executing the pipeline stage. At step 735—YES, process 700 may proceed to point B if a subsequent event notification has been received before the expiration of the time (e.g., the pipeline execution management server 230 may return to step 705 as shown in FIG. 7A), at step 735.

If, on the other hand, the time has expired and the pipeline execution management server 230 has not received a subsequent event notification (step 735—NO), process 700 may proceed to point C and may include executing the first stage of the pipeline (step 740). Process 700 may also proceed to point B in the event that the pipeline execution management server 230 determines that the pipeline should be immediately executed (e.g., step 720—YES). For example, the pipeline execution management server 230 may execute a first stage of the pipeline by comminuting with the SCM application server 220 as needed.

Process 700 may also include determining whether additional stages in the pipeline exist (step 745). If, for example, no additional stages exist, such as when only one stage exists or all previous stages of the pipeline have been executed (step 745—NO), process 700 may end. If, on the other hand, additional stages do exist and need to be executed, process 700 may further include determining commit attributes for the subsequent stage (step 750). For example, the pipeline execution management server 230 may determine the commit attributes for the subsequent stage in a similar manner as described above with respect to step 710.

Process 700 may further include determining whether to immediately execute the pipeline stage (step 755). For example, the pipeline execution management server 230 may determine whether to immediately execute the pipeline stage in a similar manner as described above with respect to step 720. If, for example, the pipeline execution management server 230 determines that the pipeline stage should be immediately executed (step 755—YES), process 700 may include executing the subsequent stage of the pipeline (step 760). For example, the pipeline execution management server 230 may execute the subsequent stage of the pipeline in a similar manner as described above with respect to the pipeline execution engine 540. Process 700 may proceed to step 745 at which point process 700 may end if no additional stages remain, or may continue to steps 750 and 755 if additional stages remain.

If, on the other hand, the pipeline execution management server 230 determines that the pipeline stage should not be immediately executed (step 755—NO), process 700 may proceed to point A and may include delaying the execution of the pipeline stage (step 730 as shown in FIG. 7B and as described above). Process 700 proceed to step 735 as also described above.

In accordance with process 700, the pipeline execution management server 230 may intelligently schedule the execution of commits in a pipeline or pipeline phase based on the historical trends and/or expected volume of commits expected to enter the pipeline. As an example pipeline execution may be delayed (e.g., by 5 minutes, 10 minutes, 15 minutes, or some other period of time) during a period of historically high commit activity (e.g., to allow for more commits to enter the pipeline for batch execution). Conversely, a pipeline may be immediately executed after a single commit has entered the pipeline during a period of historically low commit activity (e.g., to prevent unnecessary delays in execution of the pipeline including the commit). Also, pipeline execution may be delayed or execution may be forced (e.g., immediately executed) based on a priority level, risk level, execution duration, etc. In this way, resources for executing pipeline commits are more intelligently managed.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by a computing device, an event notification;
   determining, by the computing device, whether to immediately execute a pipeline including a commit associated with the event notification based on historical trends of commits entering the pipeline at a similar time period as a current time;
   immediately executing or delaying the execution of the pipeline, by the computing device, based on the determining whether to immediately execute the pipeline;
   determining, by the computing device, an attribute of the commit;
   determining, by the computing device, commit information based on the attribute of the commit, the commit information being a risk level of errors;
   determining, by the computing device, a likelihood of batching the commit for execution with other commits based on the commit information;
   determining, by the computing device, that the likelihood of batching is reduced in response to the risk level of errors being increased; and
   immediately executing the pipeline in response to receiving the event notification during a period of historically low commit activity,
   wherein the determining whether to immediately execute the pipeline is further based on the commit information.

2. The method of claim 1, further comprising executing the pipeline after a threshold period of time has elapsed after initially delaying the execution.

3. The method of claim 1, further comprising executing the pipeline after receiving a subsequent event notification event after initially delaying the execution.

4. The method of claim 1, wherein the delaying the execution causes the computing device to subsequently execute the pipeline after at least one additional commit has entered the pipeline.

5. The method of claim 1, wherein the execution of the pipeline includes execution of an initial stage of the pipeline, the method further comprising:
   determining whether to immediately execute a subsequent stage of the pipeline or delay the execution of the subsequent stage of the pipeline after executing the initial stage of the pipeline; and
   immediately executing or delaying the execution of the subsequent stage of the pipeline based on the determining whether to immediately execute the subsequent stage of the pipeline or delay the execution of the subsequent stage of the pipeline.

6. The method of claim 1, wherein the executing the pipeline includes the commit and other previous commit that have not yet been included in a pipeline execution.

7. The method of claim 1, wherein the event notification is received from a source control management application server.

8. The method of claim 1, wherein a service provider at least one of creates, maintains, deploys and supports the computing device.

9. The method of claim 1, wherein the receiving the event notification, the determining whether to immediately execute the pipeline, and the immediately executing or delaying the execution of the pipeline are provided by a service provider on a subscription, advertising, and/or fee basis.

10. The method of claim 1, wherein the computing device includes software provided as a service in a cloud environment.

11. The method of claim 1, further comprising deploying a system for optimizing scheduling of pipeline execution, comprising providing a computer infrastructure operable to perform the receiving the event notification, the determining whether to immediately execute the pipeline, and the immediately executing or delaying the execution of the pipeline.

12. The method of claim 1, wherein the historical trends include history of historical commits received within a target computing environment, and the historical trends include information identifying trends for when the historical commits have been received.

13. A computer program product for optimizing scheduling of pipeline execution, the computer program product comprising a computer readable storage medium having program instructions embodied therewith, the program instructions executable by a computing device to cause the computing device to:
   receive an event notification;
   determine whether to immediately execute a pipeline including a commit associated with the event notification based on commit information, the commit information being based on an attribute of the commit, the commit information being a risk level of errors;
   immediately executing or delaying the execution of the pipeline based on the determining whether to immediately execute the pipeline;
   determining a likelihood of batching the commit for execution with other commits based on the commit information;
   determining that the likelihood of batching is reduced in response to the risk level of errors being increased; and
   immediately executing the pipeline in response to receiving the event notification during a period of historically low commit activity.

14. The computer program product of claim 13, wherein:
   the program instructions further cause the computing device to determine historical trends of commits entering the pipeline at a similar time period as a current time; and
   the determining whether to immediately execute the pipeline is further based on the determining the historical trends of the commits entering the pipeline.

15. The computer program product of claim 13, wherein the program instructions further cause the computing device to execute the pipeline after a threshold period of time has elapsed after initially delaying the execution.

16. The computer program product of claim 13, wherein the delaying the execution causes the computing device to subsequently execute the pipeline after at least one additional commit has entered the pipeline.

17. The computer program product of claim 13, wherein the determining whether to immediately execute the pipeline is further based on comments included in a message accompanying the event notification.

18. A system comprising:
   a CPU, a computer readable memory and a computer readable storage medium associated with a computing device;
   program instructions to receive an event notification;
   program instructions to determine whether to immediately execute a pipeline including a commit associated with the event notification based on historical activity trends of commits entering the pipeline;
   program instructions to immediately execute or delay the execution of the pipeline based on the determining whether to immediately execute the pipeline;
   program instructions to determine an attribute of the commit;
   program instructions to determine commit information based on the attribute of the commit, the commit information being a risk level of errors;
   program instructions to determine a likelihood of batching the commit for execution with other commits based on the commit information;
   program instructions to determine that the likelihood of batching is reduced in response to the risk level of errors being increased; and
   program instructions to immediately execute the pipeline in response to receiving the event notification during a period of historically low commit activity,
   wherein the determining whether to immediately execute the pipeline is further based on the commit information, and
   the program instructions are stored on the computer readable storage medium for execution by the CPU via the computer readable memory.

19. The system of claim 18, wherein the computer readable storage medium comprises a commit additional information repository that includes historical risk information, and the historical activity trends include the historical risk information.

* * * * *